US006940559B2

(12) United States Patent
Kumakura et al.

(10) Patent No.: US 6,940,559 B2
(45) Date of Patent: *Sep. 6, 2005

(54) COLOR REPRODUCTION CORRECTION CIRCUIT FOR COLOR REPRESENTATION AND A COLOR DISPLAY

(75) Inventors: Ken Kumakura, Kawasaki (JP); Kazuyoshi Yamada, Yokohama (JP); Hideaki Ohki, Yokohama (JP); Hiroshi Ohtaka, Kawasaki (JP); Toshio Ueda, Kawasaki (JP)

(73) Assignee: Fujitsu Hitachi Plasma Display Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/860,580

(22) Filed: Jun. 4, 2004

(65) Prior Publication Data

US 2004/0218101 A1 Nov. 4, 2004

Related U.S. Application Data

(63) Continuation of application No. 09/878,335, filed on Jun. 12, 2001, now Pat. No. 6,753,930.

(30) Foreign Application Priority Data

Jul. 28, 2000 (JP) ........................................ 2000-229714

(51) Int. Cl.$^7$ .............................. H04N 1/60; H04N 9/68
(52) U.S. Cl. ........................ 348/650; 348/612; 348/645; 348/659; 348/675; 382/167; 358/518
(58) Field of Search ................................. 348/650, 649, 348/657, 645, 655, 652, 674, 675, 612, 624, 625, 627, 254, 255, 256, 659, 651, 660, 656, 653, 654, 658; 382/167, 162, 274, 275; 358/518, 519, 523; 345/589, 590, 591, 690, 72, 88

(56) References Cited

U.S. PATENT DOCUMENTS

| 4,694,330 | A |   | 9/1987  | Tanaka et al. |
|-----------|---|---|---------|---------------|
| 5,111,281 | A |   | 5/1992  | Sekiguchi |
| 5,303,071 | A |   | 4/1994  | Kakimura |
| 5,412,433 | A |   | 5/1995  | Holland et al. |
| 5,541,742 | A |   | 7/1996  | Imao et al. |
| 5,548,697 | A |   | 8/1996  | Zortea |
| 6,064,447 | A |   | 5/2000  | Sugimoto et al. |
| 6,160,912 | A | * | 12/2000 | Usami ........................ 382/167 |
| 6,243,133 | B1 | * | 6/2001 | Spaulding et al. ....... 348/223.1 |
| 6,259,811 | B1 |   | 7/2001  | Tsuji |
| 6,424,374 | B2 |   | 7/2002  | Itakura |
| 6,476,877 | B2 | * | 11/2002 | Kihara et al. ................ 348/650 |
| 6,594,387 | B1 |   | 7/2003  | Pettitt et al. |
| 6,618,079 | B1 | * | 9/2003  | Higuchi .................... 348/223.1 |
| 6,665,434 | B1 | * | 12/2003 | Yamaguchi ................. 382/162 |
| 6,753,930 | B2 | * | 6/2004  | Kumakura et al. ......... 348/650 |

FOREIGN PATENT DOCUMENTS

| EP | 614 321 A2 | 9/1994 |
| EP | 614 321 A3 | 10/1996 |
| JP | 57-23478 | 5/1982 |
| JP | 10-174117 | 6/1998 |

* cited by examiner

Primary Examiner—John Miller
Assistant Examiner—Jean W. Désir
(74) Attorney, Agent, or Firm—Staas & Halsey LLP

(57) ABSTRACT

The color reproduction correction circuit which corrects the color distortion caused when color signals using the first combination of the three primary colors are reproduced in a color display of the second combination of the different primary color sources has been disclosed, wherein: a provided color correction circuit generates the mixed color signal by multiplying the color signal in question by the specified coefficients and adding the mixed color signal to other color signals; the mixed colors in the second combination are used as primary color light sources in the second combination; the specified coefficients are determined so that these mixed color light sources are made close to the coordinates of the primary color light sources of the first combination; and the luminescent chromaticity values of the three primary colors are corrected so that the chromaticity values of the device match those specified by the signal system.

6 Claims, 13 Drawing Sheets

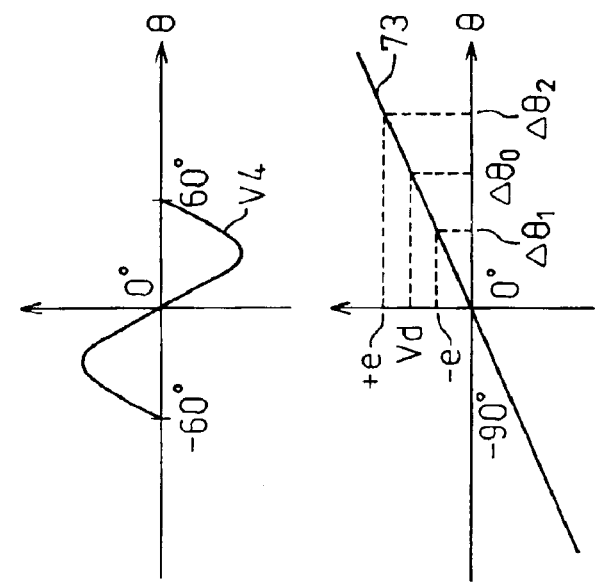
Fig.4D PRIOR ART
Fig.4E PRIOR ART
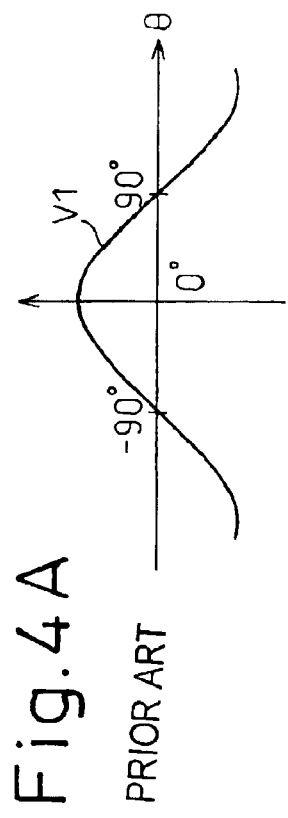
Fig.4A PRIOR ART
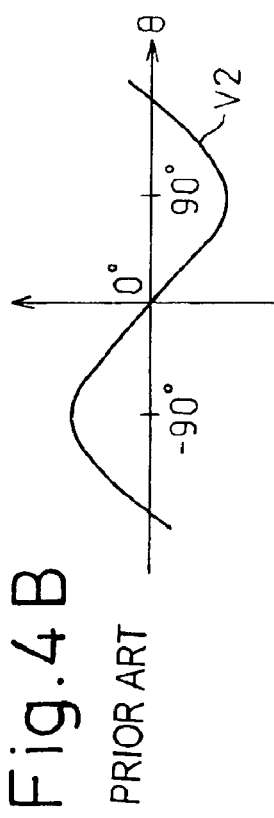
Fig.4B PRIOR ART
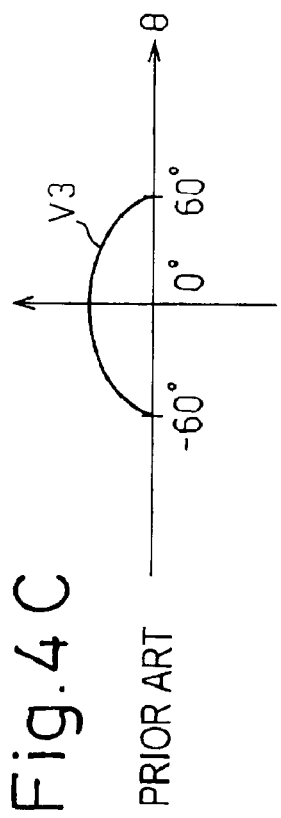
Fig.4C PRIOR ART COLOR REPRODUCTION CORRECTION CIRCUIT FOR COLOR REPRESENTATION AND A COLOR DISPLAY

CROSS-REFERENCE TO RELATED APPLICATIONS

This application is continuation of application Ser. No. 09/878,335 filed Jun. 12, 2001, which is now U.S. Pat. No. 6,753,930.

BACKGROUND OF THE INVENTION

The present invention relates to a color correction circuit for color representation and a color display comprising such a color correction circuit. More particularly, the present invention relates to a color correction circuit appropriate to use in such digital display devices as a plasma display panel (PDP) and a digital micro-mirror device (DMD) in which primary color light sources, different from fluorescent materials of a CRT, are used and the relation between the applied signal strength and the intensity of display is linear because the intensity of display is digitally controlled.

A color television receiver widely used at the present time uses fluorescent materials of three primary colors, which are specified by the EBU (European Broadcasting Union), and the chromaticity values of x and y of the fluorescent materials of three primary colors (red, green, blue) are different from those of the fluorescent materials (NTSC-compliant fluorescent materials) specified by the NTSC system. Since the color reproduction area of a color television receiver is narrower than that of the NTSC-compliant fluorescent materials, it is known that a distortion in color reproduction characteristics of a color television receiver is caused to occur when color video signals of the NTSC system are displayed on a color television receiver. This phenomenon is described using the UCS chromaticity diagram in FIG. 1.

FIG. 1 illustrates a distortion in color reproduction caused by the difference in the chromaticity values of x and y between the three primary color fluorescent materials (red, green, blue) of a currently used color television receiver and the NTSC-compliant fluorescent materials. In the figure, reference number 1 refers to the color reproduction area of the NTSC-compliant fluorescent materials and reference number 2 refers to the color reproduction area of a currently used color television receiver. Each circle g, yg, s, r, c, p, and b in the figure indicates green, yellow-green, ocher, red, cyan, pink, and blue, respectively, in the color reproduction area 1 of the NTSC-compliant fluorescent materials, and each bullet dot pointed by the arrow indicates a color when the NTSC signal corresponding to the color is displayed on a currently used color television receiver, in other words, the reproduced color in the color reproduction area 2. The arrow indicates the shift in position in the UCS chromaticity diagram between a reproduced color in the color reproduction area 1 and that in the color reproduction area 2 due to the distortion in color reproduction. The double circles yg and b indicate that the reproduced colors are not influenced by the distortion.

As shown in the figure, there exists a difference between the color reproduction area 1 of the NTSC-compliant fluorescent materials and the color reproduction area 2 of a currently used color television receiver. The distortion of the color reproduction characteristics in a color television receiver caused by this difference occurs in the way that the distortion causes most reproduced colors to move toward the axis line 16 that connects yellow-green yg and blue b, and for example, green g or ocher s is compressed to yellow-green yg by the distortion in color. As described above, the distortion in color reproduction does not occur irregularly, instead occurs in the way that the distortion causes the position of a color reproduced by the NTSC-compliant fluorescent materials to move from both sides of an axis line (axis line 16 in FIG. 1) of some hues toward the axis line. In this way, the color reproduction characteristics of a color television receiver are degraded.

An example of the conventional art that solves this problem is disclosed in Japanese Unexamined Patent Publication (Kokai) No. 57-23478. This disclosed conventional art is briefly described below.

As mentioned above, a distortion in color reproduction occurs in the direction toward an axis line in a currently used color television receiver. The conventional art corrects the distortion and improves the color reproduction characteristics by enlarging the amount of the change in the color so that the position of the color deviates from the axis line. In other words, as shown in FIG. 1, the conventional art corrects the compression in the direction toward the axis line 16 and cancels the distortion of color reproduction by enlarging the amount of the change in the color so that the position of the color deviates from the axis line 16, that is, in the directions shown by the arrows 17 and 18.

This correction method is described using FIG. 2. In the figure, the horizontal axis is marked with phases of input chromatic signals of a color television receiver and the vertical axis is marked with phases of the corrected chromatic signals. When not corrected, the relation in phase of these chromatic signals is as shown by a dotted line, on the other hand, when corrected by the above-mentioned conventional art, the relation in phases of these chromatic signals is as shown by a solid line. By this correction, the color change is caused in the directions shown by the arrows 17 and 18 in FIG. 1 as mentioned above.

FIG. 3 shows a block diagram that illustrates an example of a conventional color reproduction correction device that corrects the distortion in color reproduction by adjusting the hue in the direct current control method, as mentioned above. In the figure, reference number 3 refers to a band amplifier, number 4, a reference color carrier oscillator, number 5, a phase shifter, number 6, a 90° phase advancer (+90°), number 7, a hue adjuster, number 8, a limiter, numbers 9 and 10, phase detectors (P.D.), number 11, a clipper, number 12 a multiplier, number 13 a direct current power source for hue adjustment, number 14, an adder, and number 15, a color demodulator circuit.

In FIG. 3, the chromatic signals of the received color video signals are limited in bandwidth by the band amplifier 3 and are supplied to the phase detectors 9 and 10 via the limiter 8, as well as to the color demodulator circuit 15. The burst signals taken from the band amplifier 3 are supplied to the reference color carrier oscillator 4 and a reference color carrier synchronized with these burst signals in phase is obtained. After being shifted in phase in the phase shifter 5, the reference color carrier is supplied directly to the phase detector 9, and at the same time supplied to the phase detector 10 after the phase is advanced in the 90° phase advancer 6. If the characteristics of the phase shifter 5 are appropriately selected so that the phase of the output reference color carrier is yellow green, that is, 5° with respect to the phase of the burst signal of the input chromatic signal, the phase detector 9 is a phase detector for yellow green, and the phase detector 10, a phase detector for the axis perpendicular to the yellow green signal. If we assume that the phase of yellow green signal is the reference phase, and the phase of the chromatic signal with respect to the reference phase is θ, the voltage level of the output signal V1 of the phase detector 9 will change with respect to phase θ as shown by the curve V1 in FIG. 4A, and that of the output signal V2 of the phase detector 10, as shown by the curve V2 in FIG. 4B. The output signal V1 of the phase detector 9 is clipped by the clipper 11 at a specified clip level, and signal V3, which has the voltage characteristic with respect to phase θ as shown by the curve V3 in FIG. 4C, is obtained. Thus the output signal of the clipper 11 is adjusted appropriately so that the corrections 17 and 18 in the vicinity of yellow green as shown in FIG. 1 are obtained. Here, for example, the clipping level of the clipper 11 is selected so that the range is between −60 and +60°. The output signal V3 of the clipper 11 is multiplied by the output signal V2 of the phase detector 10 in the multiplier 12. Thus the voltage level of the output signal V4 of the multiplier 12 forms the curve V4 as shown in FIG. 4D. The output signal (voltage) V4 of the multiplier 12 and the direct voltage Vd of the direct current power source 13 are added in the adder 14 and supplied as a control voltage to the hue adjuster 7.

The hue adjuster 7 changes the phase of the reference color carrier from the reference color carrier oscillator 4 according to the control voltage from the adder 14. The change in phase is, for example, conducted by adding the color sub-carrier and the shifted one of the color sub-carrier, which is shifted by 90°, in a proportion according to the control signal. The change in phase of the color sub-carrier caused by the hue adjuster 7 is controlled using the control voltage from the adder 14, that is, the output voltage Vd of the direct current power source 13 and the output voltage V4 of the multiplier 12. If it is assumed that the vertical axis is marked with values of the output voltage Vd of the direct current power source 13 and the horizontal axis is marked with values of the phase Δθ (delta theta) of the output color sub-carrier of the hue adjuster 7 with respect to the reference color carrier of the reference color carrier oscillator 4, the phase Δθ will appear, as shown in FIG. 4E, with respect to the output voltage Vd of the direct current power source 13. Since the control voltage of the hue adjuster 7 is the sum of the output direct current voltage Vd of the direct current power source 13 and the output voltage V4 of the multiplier 12, which has the characteristic as shown in FIG. 4D, if the output voltage V4 of the multiplier 12 changes in the range between −e and +e in FIG. 4D, the output voltage of the adder 14 changes in the range between the specified direct voltage Vd from the direct current power source 13 +/−e, therefore, the phase Δθ is Δθ0 for the direct current voltage Vd when the phase of the chromatic signal is outside the range between −60° and +60°, and that changes in the range between the Δθ1 and the Δθ2 (Δθ1<Δθ0<Δθ2), when the chromatic signal is within the range between −60° and +60°. Then, when the reference color carrier from the hue adjuster 7 is supplied to the color demodulator circuit 15, and the chromatic signal from the band amplifier 3 is demodulated, the signal of the color, of which the amount of the change in the color in the vicinity of yellow-green is enlarged, is demodulated as shown in FIG. 2 and the correction of the distortion in color reproduction is carried out as shown in FIG. 1.

By the way, in the above-mentioned conventional art there exist the following problems:
1. A number of demodulation axes are necessary to improve and attain the color reproduction with less distortion because the color reproduction is corrected by using plural demodulation axes best fit to the specific hues and combining the selected hue ranges that found to be appropriate. Therefore, a problem may occur that the level of the color reproduction improvement is in proportion to the scale of the correction circuit, and it is almost impossible to match the color in a correction circuit of a small scale.
2. When plural signal systems, to which different chromaticity values of x and y are assigned, are to be dealt with, plural correction circuits are required, accordingly, resulting in an increase in the circuit scale.
3. Because the targets to be corrected are color demodulator circuits and color difference signals, it is difficult to deal with the input signals of the three primary colors (RGB signals).
4. Because the demodulation gain of R-Y is increased in order to improve the hues of red, magenta, and cyan, the input of red is saturated and the collapse of red occurs.

SUMMARY OF THE INVENTION

The present invention has been developed to solve these problems and the objective is to realize a color reproduction correction circuit and a color display that can precisely reproduce any color in the color reproduction range of a picture display device with a simple circuit structure.

To achieve the above-mentioned objective, the color reproduction correction circuit of the present invention corrects the luminescent chromaticity values of the three primary colors so that the chromaticity values of x and y of the three primary color light sources of a picture display device match those specified by the signal system. In other words, the luminescence of each primary color light source is made equal to the specified chromaticity values of each primary color by mixing the amount of luminescence of the primary color light source in question multiplied by the specified coefficient, and those of other primary colors, in addition to the luminescence of the primary color light source in question.

The effects are as follows.
1. Because the three primary colors are identical, such correction as that of the modulating signal of the demodulation axis is not necessary and there is no distortion in color reproduction for any color in the color reproduction range of a picture display device.
2. When plural signal systems, to which different chromaticity values of x and y are assigned, are to be dealt with, only the modification of the luminescence ratios (coefficients) of the two colors other than that in question is required, resulting in no increase in circuit scale.
3. Because the luminescent chromaticity values of the three primary colors are corrected, and not the signal, there is no restrict on the form of input signals.
4. Because the modulation or gain operation of the demodulation axis is not carried out, no color collapse due to input saturation occurs.

BRIEF DESCRIPTION OF THE DRAWINGS

The present invention will be more clearly understood from the description as set below with reference to the accompanying drawings, wherein:

FIGS. 4A through 4E show the signal characteristics of each part of the conventional color signal correction circuits in order to explain the operation;

DESCRIPTION OF THE PREFERRED EMBODIMENTS

First the principles of the present invention are described with reference to FIG. 5A through FIG. 5C.

Figure 1:
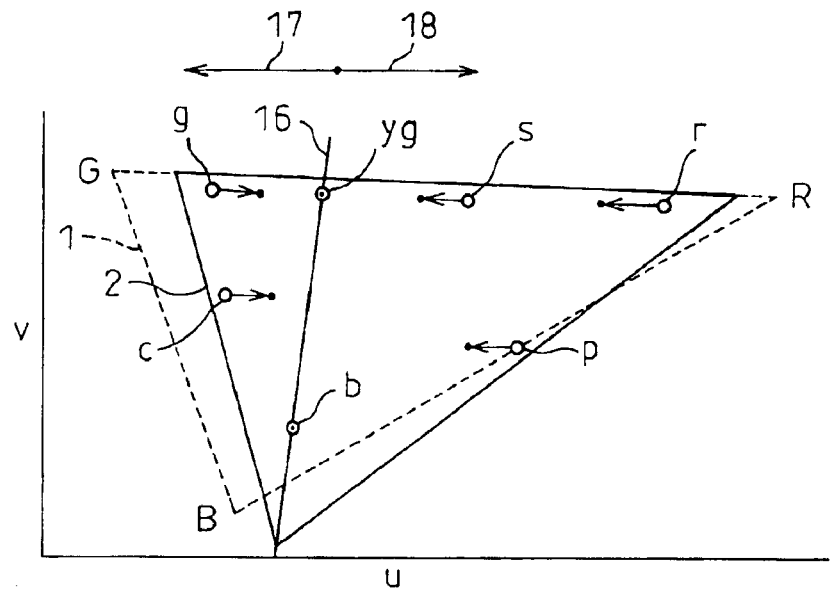
FIG. 1 illustrates the occurrence of distortion in color reproduction caused by the difference between the NTSC-compliant fluorescent materials and the EBU-compliant fluorescent materials.
Figure 2:
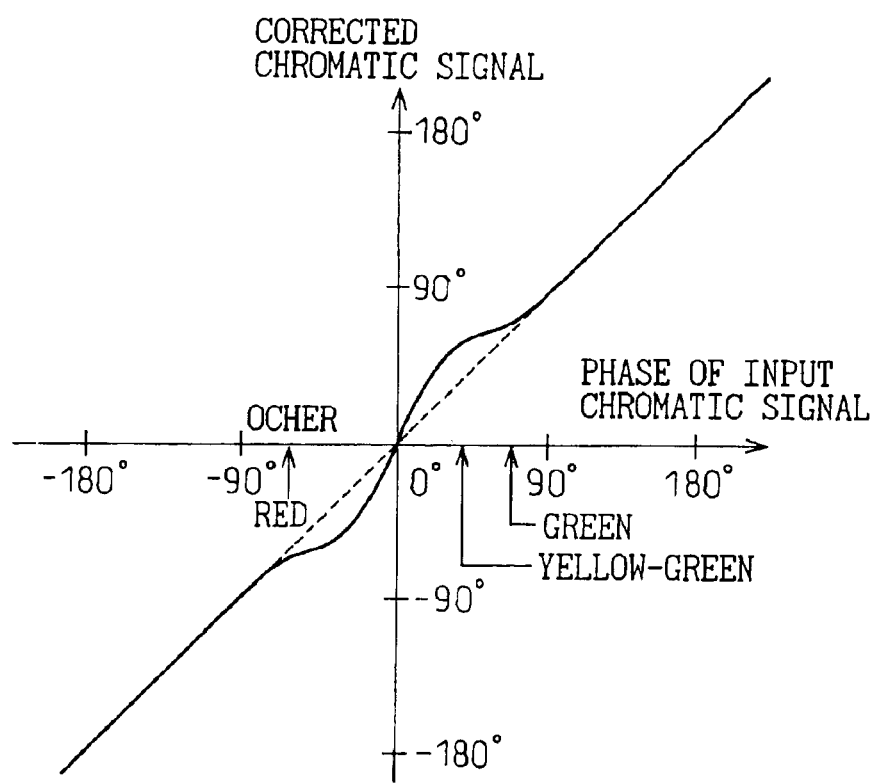
FIG. 2 shows the chromatic signal conversion characteristics in the conventional correction circuit.
Figure 3:
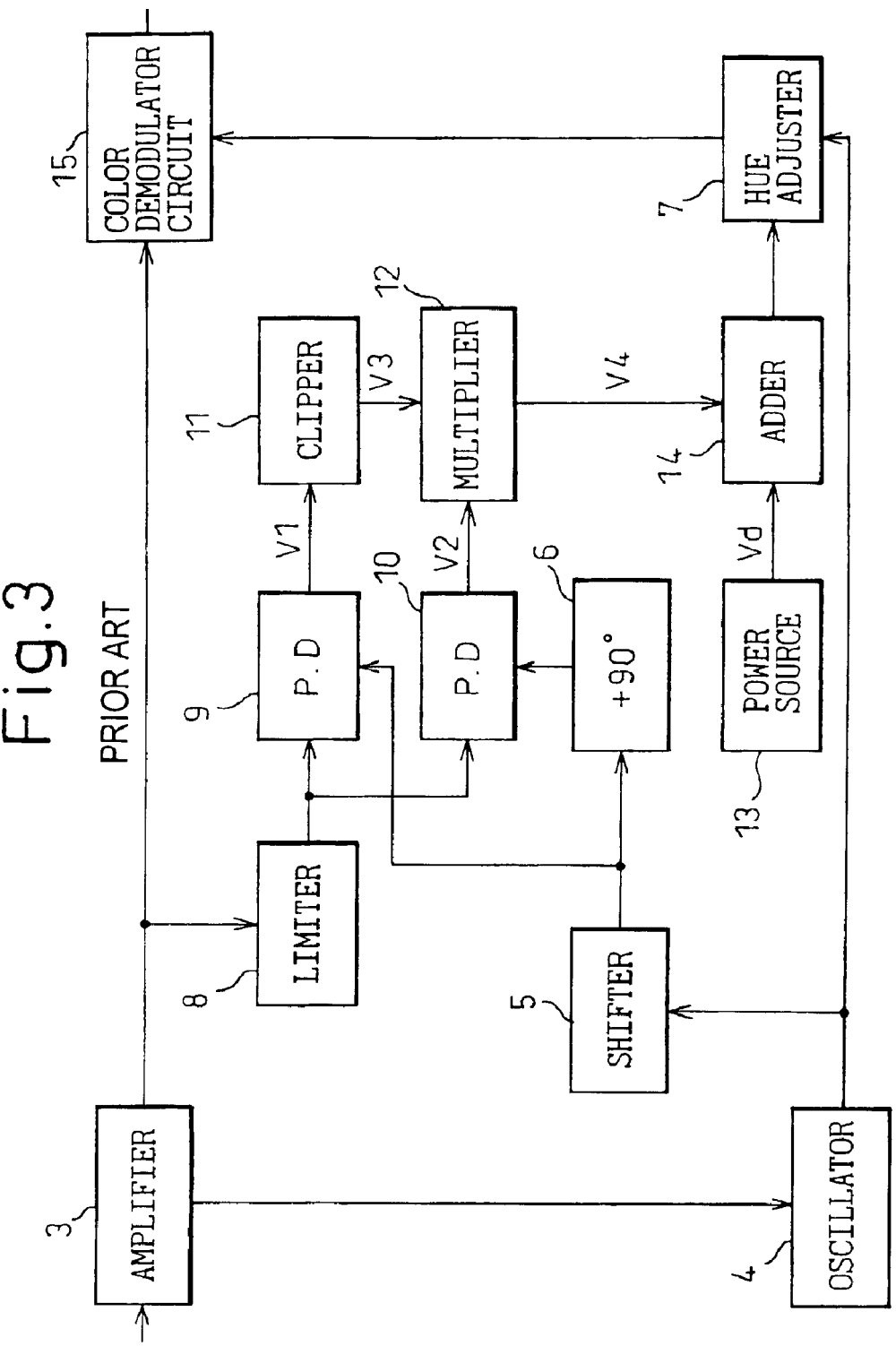
FIG. 3 is a block diagram that shows an example structure of the conventional color signal correction circuit.
Figure 5A:
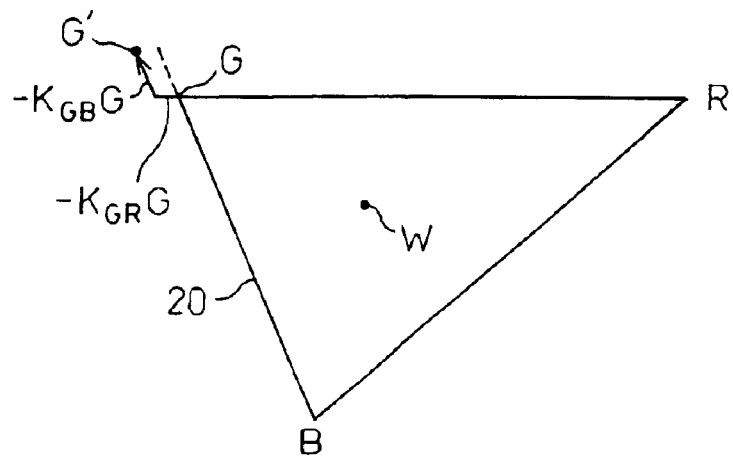
FIGS. 5A through 5C show the principles of the present invention.

FIG. 5A illustrates the case where the color reproduction range of a color display device is narrower than that specified by the standard of input color video signal. The green (G) signal is described as an example. When the $G_o$ signal of the input color video signal is supplied to a color display and reproduced as it is, the signal is reproduced in the outermost corner G of the color reproduction range 20 of the color display. The $G_o$ signal, however, should be displayed as a color at the position G' outside the color reproduction range 20. Therefore, the negative component $(-K_{GR}G)$ of the input signal R, which is the input signal G multiplied by $(-K_{GR})$ ($K_{GR}$ is positive), and the negative component $(-K_{GB}G)$ of the input signal B, which is the input signal G multiplied by $(-K_{GB})$ ($K_{GB}$ is positive), are added as two vectors to produce the G' signal that matches the chromaticity values of the $G_o$ signal. The same correction is applied to the blue signal (B) and the red signal (R).

Figure 5B:
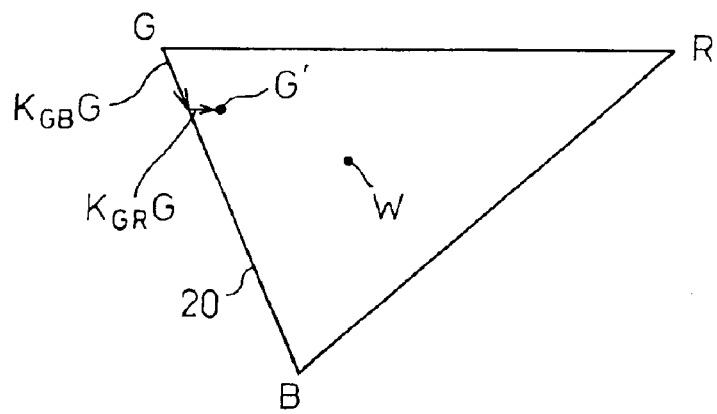

FIG. 5B illustrates the case where the color reproduction range of a color display device is wider than that specified by the standard of input color video signal. Again, the green (G) signal is described as an example. When the $G_0$ signal of the input color video signal is supplied to a color display and reproduced as is, the signal is reproduced in the outermost corner G of the color reproduction range 20 of the color display. The $G_0$ signal, however, should be displayed as a color at the position G' within the color reproduction range 20. Therefore, the positive component $(K_{GR}G)$ of the input signal R, which is the input signal G multiplied by $(K_{GR})$ ($K_{GR}$ is positive), and the positive component $(K_{GB}G)$ of the input signal B, which is the input signal G multiplied by $(K_{GB})$ ($K_{GB}$ is positive), are added as two vectors to produce the G' signal that matches the chromaticity values of the $G_0$ signal. The same correction is applied to the blue signal (B) and the red signal (R). Although this correction reproduces exactly the color of the original input color video signal, the color saturation is degraded and the image loses its vividness.

Figure 5C:
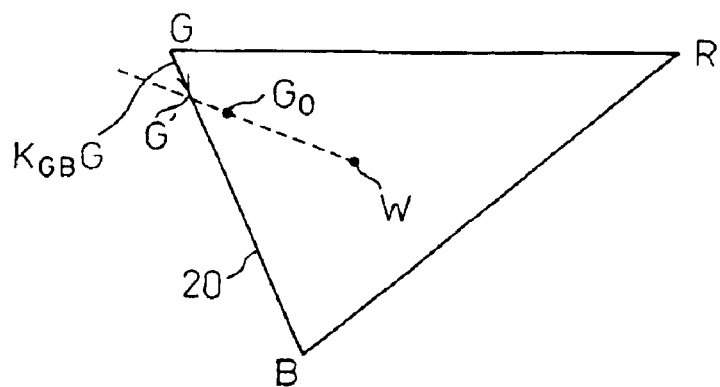

FIG. 5C illustrates a simple example of correction when the color reproduction range of a color display device is wider than that specified by the standard of the input color video signal. Although the $G_0$ signal of this input color video signal should be reproduced at the position indicated by $G_0$, the signal is reproduced at the point G when the signal is directly reproduced on the color display. Therefore, in this case, the signal is corrected to be reproduced as a color at the position G' where the line connecting the position w of white and $G_0$ crosses the outermost side of the color reproduction range 20. Then, the positive component $(K_{GB}G)$ of the input signal B, which is the input signal G multiplied by $K_{GB}$ ($K_{GB}$ is positive), must be added as a vector so that the signal is reproduced as a color at the G' position. Though the positions of G' and G0 are different in this case, the hue is the same and the color saturation is kept high and its vividness is maintained. The same correction is applied to the blue signal (B) and the red signal (R). This correction requires only one more color signal in each color correction circuit, and therefore, only one adder circuit for a channel is required, resulting in a simple circuit structure.

Next the present invention is described using an example in which video signals of the NTSC standard system are reproduced in a plasma display.

Figure 6:
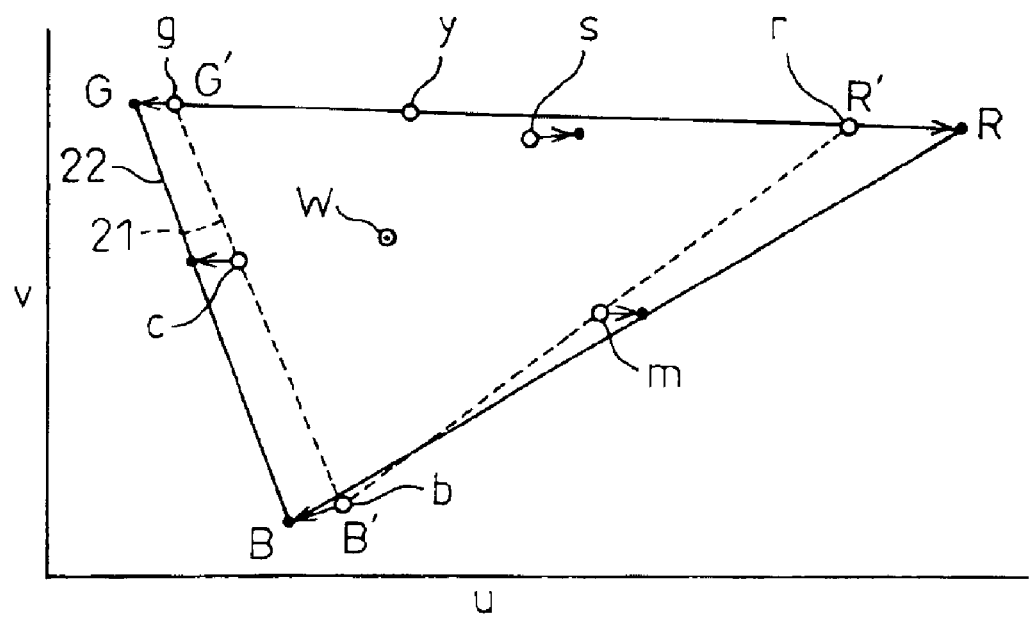
FIG. 6 illustrates the difference between the fluorescent materials of a plasma display and the NTSC-compliant fluorescent materials, and the principles of correction.

FIG. 6 is the UCS chromaticity diagram that illustrates the distortion in color reproduction caused by the difference in the chromaticity values of x and y between the three primary fluorescent materials (green (G), blue (B), red (R)) of a plasma display and the NTSC-compliant fluorescent materials. In FIG. 6, reference number 21 refers to a dashed line that forms the color reproduction area of the NTSC-compliant fluorescent materials, and reference number 22 refers to a solid line that forms the color reproduction area of a currently used plasma display. As shown in the figure, the color reproduction area 22 of the plasma display is wider than the color reproduction area 21 of the NTSC-compliant fluorescent materials. In the figure, the white circles g, y, s, r, c, m, b, and w stand for green, yellow, ocher, red, cyan, magenta, blue, and white in the color reproduction area 21 of the NTSC-compliant fluorescent materials, respectively. The bullet dots pointed by the arrows indicate the colors reproduced from the corresponding NTSC signals in the color reproduction area 22 of a currently used plasma display. These arrows indicate that the reproduced colors in the color reproduction area 21 are distorted in the color reproduction area 22 and the positions of the reproduced colors are shifted in the UCS chromaticity diagram. The double circle w indicates that the reproduced color is not distorted.

As shown in FIG. 6, because there exists a difference between the color reproduction area 21 formed by the NTSC-compliant fluorescent materials and the color reproduction area 22 formed by a currently used plasma display, the primary signals green g, red r, and blue b are reproduced through the conversion G'→G, R'→R, and B'→B when the NTSC-compliant fluorescent materials are reproduced in the plasma display, therefore, a distortion in color reproduction may occur over the entire color reproduction area with the center white w.

Therefore, in order to improve the quality of reproduction of the NTSC signals in the plasma display, it is necessary to add the correction signals that satisfy the vectors G→G', R→R', and B→B' to each primary input signal G, B, and R in FIG. 6, respectively.

Figure 7:
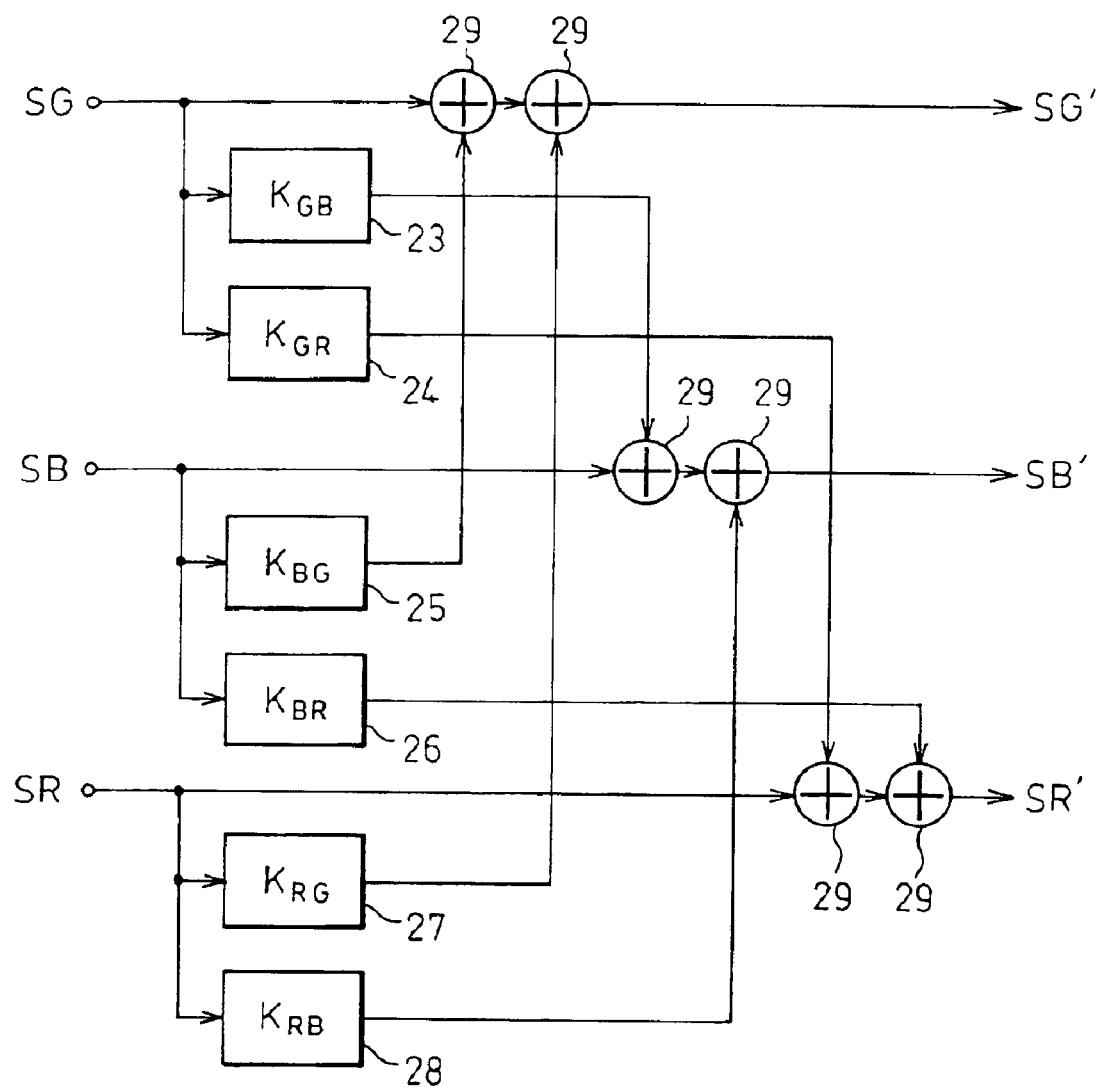
FIG. 7 is a block diagram that shows the structure of the color signal correction circuit in the first embodiment of the present invention.

FIG. 7 is a block diagram that shows the structure of the color signal correction circuit in the first embodiment of the present invention. This circuit receives the green (G) signal SG, the blue (B) signal SB, and the red (R) signal SR as input color video signals and puts out the corrected signals SG', SB', and SR' after applying the color correction as explained in FIG. 5. It is assumed that the γ correction, which will be described later, is not applied to the input signals.

This circuit carries out the following correction procedure.

$$SG'=SG+K_{BG}\cdot SB+K_{RG}\cdot SR$$

$$SB'=SB+K_{GB}\cdot SG+K_{RB}\cdot SR$$

$$SR'=SR+K_{GR}\cdot SG+K_{BR}\cdot SB,$$

where,
$K_{BG}$: Mixture coefficient of the B signal for the G signal
$K_{RG}$: Mixture coefficient of the R signal for the G signal
$K_{GB}$: Mixture coefficient of the G signal for the B signal
$K_{RB}$: Mixture coefficient of the R signal for the B signal
$K_{GR}$: Mixture coefficient of the G signal for the R signal
$K_{BR}$: Mixture coefficient of the B signal for the R signal The mixture coefficients may be positive or negative.

As described above, the circuit in FIG. 7 carries out the color correction described in FIG. 5A through FIG. 5C. In this circuit, only the G signal is considered in FIG. 5A, for example. This corresponds to the case where SB=0, SR=0, and the following formulas are introduced from the above-mentioned formulas, $$SG'=SG+K_{GB}\cdot 0+K_{RG}\cdot 0=SG$$

$$SB'=0+K_{GB}\cdot SG+K_{RB}\cdot 0=K_{GB}SG$$

$$SR'=0+K_{GR}\cdot SG+K_{RG}\cdot 0=K_{GR}SG,$$

and the correction as described in FIG. 5A is carried out.

In FIG. 7, reference numbers 23 and 24 refer to multipliers that multiply the signal SG by the mixture coefficients $K_{GB}$ and $K_{GR}$, respectively, reference numbers 25 and 26, multipliers that multiply the signal SB by the mixture coefficients $K_{BG}$ and $K_{BR}$, respectively, reference numbers 27 and 28, multipliers that multiply the signal SR by the mixture coefficients $K_{RG}$ and $K_{RB}$, respectively, and reference number 29 refers to an adder. This circuit realizes the above-mentioned operations. This type of color correction circuit is realized in, for example, a digital signal processor.

However, white balance may change, depending on whether or not the color signal correction circuit in FIG. 7 is used. In other words, when the color signal correction circuit is used, the white balance of the input color video signal cannot be maintained. In addition, if the input color video signals SG, SB and SR have an amplitude beyond a specified value, the corrected signals will exceed the dynamic range. In this case, the signals that exceed the limit value are clipped in the clipper, but distortion in color reproduction may be caused.

These problems are overcome in the color signal correction circuit in the second embodiment described below. In the second embodiment through the fourth embodiment, a plasma display is used as a display device, for example, and it is assumed that the γ correction, which is described later, is not applied to the input signals.

Figure 8:
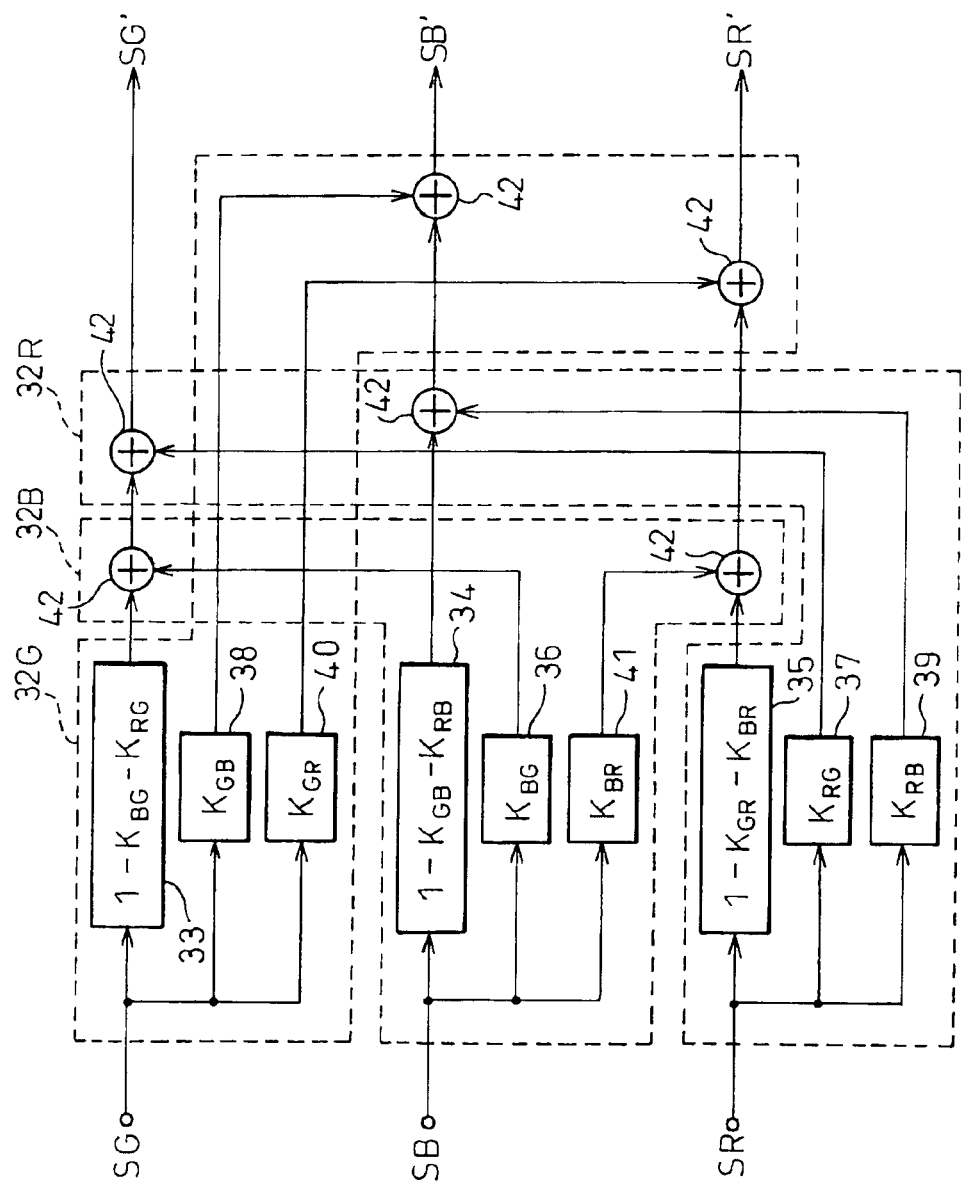
FIG. 8 is a block diagram that shows the structure of the color signal correction circuit in the second embodiment of the present invention.

FIG. 8 is a block diagram that shows the structure of the color signal correction circuit used in the plasma display in the second embodiment of the present invention. This color signal correction circuit corrects the input color video signals SG, SB, and SR in the way as described in FIG. 6, and puts out the corrected signals SG', SB', and SR'. The color signal correction circuit in the second embodiment carries out the following correction procedure.

$$SG'=SG(1-K_{BG}-K_{RG})+K_{BG}SB+K_{RG}SR$$

$$SB'=SB(1-K_{GB}-K_{RB})+K_{RB}SR+K_{GB}SG$$

$$SR'=SR(1-K_{GR}-K_{BR})+K_{BR}SB+K_{GR}SG,$$

where,
$K_{BG}$, $K_{RG}$, $K_{GB}$, $K_{RB}$, $K_{GR}$, and $K_{BR}$ are the mixture coefficients, respectively.

By means of the correction specified by these formulas, the white circled colors g, y, s, r, c, m, b, and w in the color reproduction area 21 in FIG. 6 are reproduced at almost the same positions (prime colors) in the chromaticity diagram, and the reproductive quality is improved. In addition, blue b, which is outside the color reproduction area 21 but within the color reproduction area 22, is also reproduced at almost the same position. As explained above, the color reproduction of any hue can be corrected by multiplying the primary color signal in question, which is the correction input signal, by a specified coefficient and mixing (adding or subtracting) it with other primary colors.

In FIG. 8, reference numbers 32G, 32B, and 32R refer to the color correction circuits that correct each color signal. The color correction circuits 32G, 32B, and 32R have similar structures: the color correction circuit 32G comprises a multiplier 33 for amplitude correction that multiples $(1-K_{BG}-K_{RG})$, multipliers 38 and 40 that multiple the color signals in question by the mixture coefficients $K_{GB}$ and $K_{GR}$, respectively, and two adders 42; the color correction circuit 32B comprises a multiplier 34 for amplitude correction that multiples $(1-K_{GB}-K_{RB})$, multipliers 36 and 41 that multiple the color signals in question by the mixture coefficients $K_{BG}$ and $K_{BR}$, respectively, and two adders 42; and the color correction circuit 32R comprises a multiplier 35 for amplitude correction that multiples $(1-K_{GR}-K_{BR})$, multipliers 37 and 39 that multiple the color signals in question by the mixture coefficients $K_{RG}$ and $K_{RB}$, respectively, and two adders 42. These color correction circuits can also realized in a digital signal processor.

In the second embodiment, the strength of the color signal in question is attenuated by the amount corresponding to the signals to be added when other color signals multiplied by the mixture coefficients are added. Thus the problem in the first embodiment, that the white balance of the input color video signal cannot be maintained, is solved.

Figure 9:
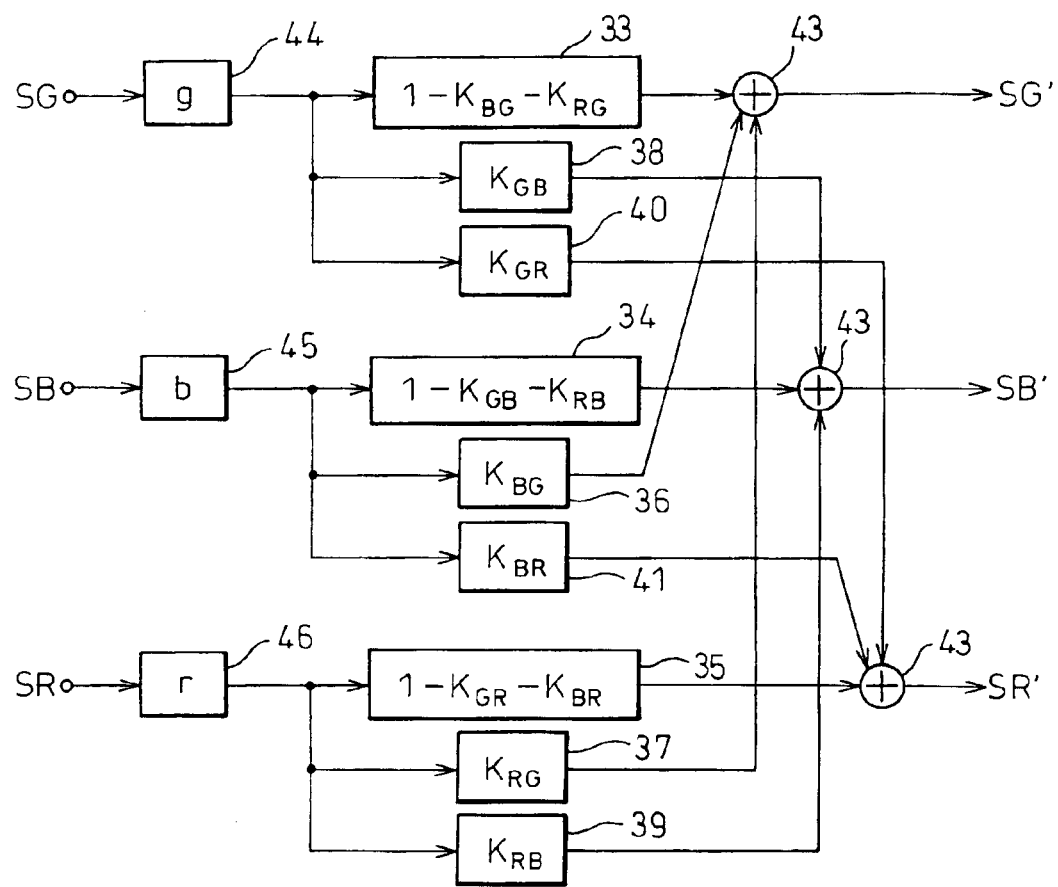
FIG. 9 illustrates the point of a problem when a circuit that adjusts the signal strength is installed in the previous stage of the color signal correction circuit in the second embodiment in order to adjust the white balance.
Figure 10:
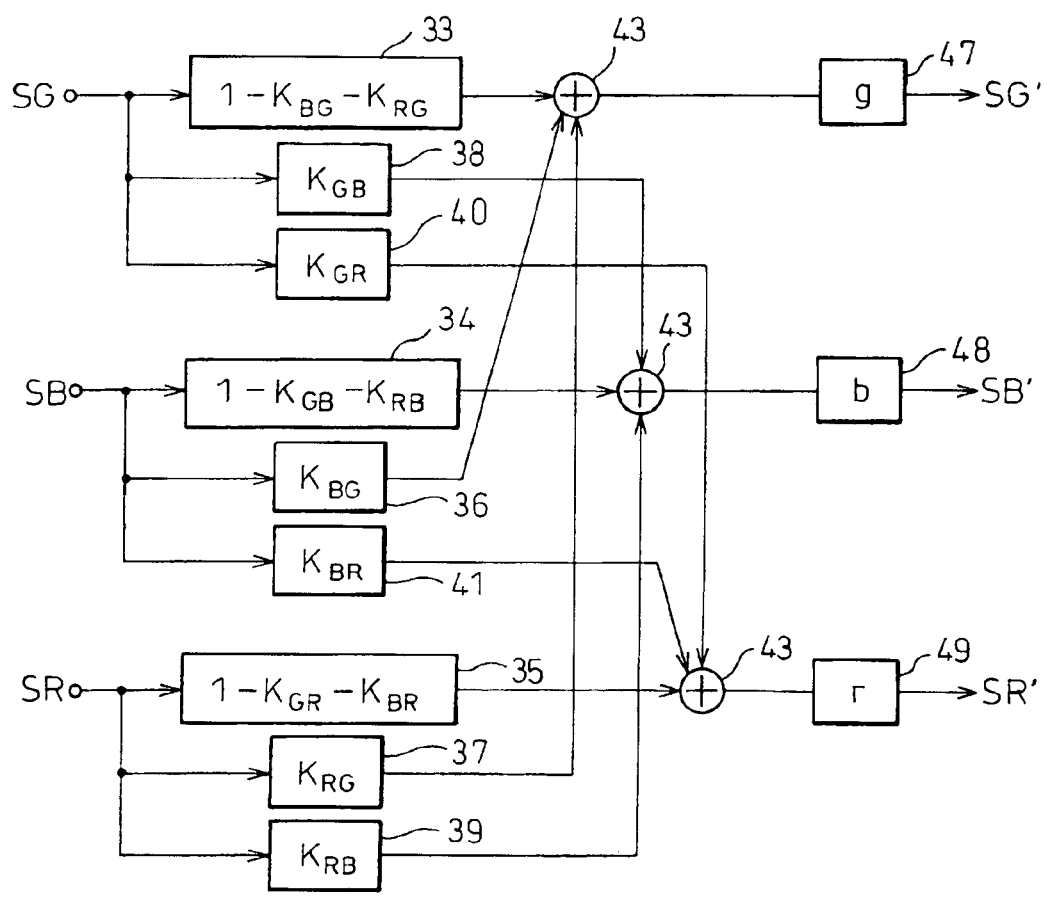
FIG. 10 illustrates the point of a problem when a circuit that adjusts the signal strength is installed in the subsequent stage of the color signal correction circuit in the second embodiment in order to adjust the white balance.

For a display device, there may be a case in which the user adjusts the white balance of his own will. To enable the adjustment of white balance, the strength of each color signal needs to be made adjustable independently. A problem, however, is caused if the strength of each color signal is made adjustable independently when the color signal correction circuit of the present invention is used. For example, FIG. 9 shows a structure in which attenuation circuits (g, b, r (between 0 and 1 and at least one circuit is equal to 1) 44, 45, and 46 that adjust the strength of each color signal are provided in the previous stage of the color signal correction circuits 32G, 32B, and 32 R in the second embodiment in order to enable the independent adjustment of the strength of each color of the input color video signals. In this circuit structure, though the chromaticity values of the corrected signal do not change at the time of the white balance adjustment, the problem that the white balance changes depending on whether or not the color signal correction circuit is used. On the other hand, FIG. 10 shows a structure in which attenuation circuits (g, b, r (between 0 and 1 and at least one circuit is equal to 1) 47, 48, and 49 that adjust the strength of each color signal are provided in the subsequent stage of the color signal correction circuits 32G, 32B, and 32R in the second embodiment in order to enable the independent adjustment of the strength of each color of the input color video signals. Though the white balance does not change depending on whether or not the color signal correction circuit is used in this circuit structure, the problem that the chromaticity values of the corrected signal change when the white balance is adjusted occurs. Therefore, it is necessary to enable the adjustment within the color signal correction circuit when the white balance is adjusted. In the third embodiment, the white balance is made adjustable within the color signal correction circuit.

Figure 11:
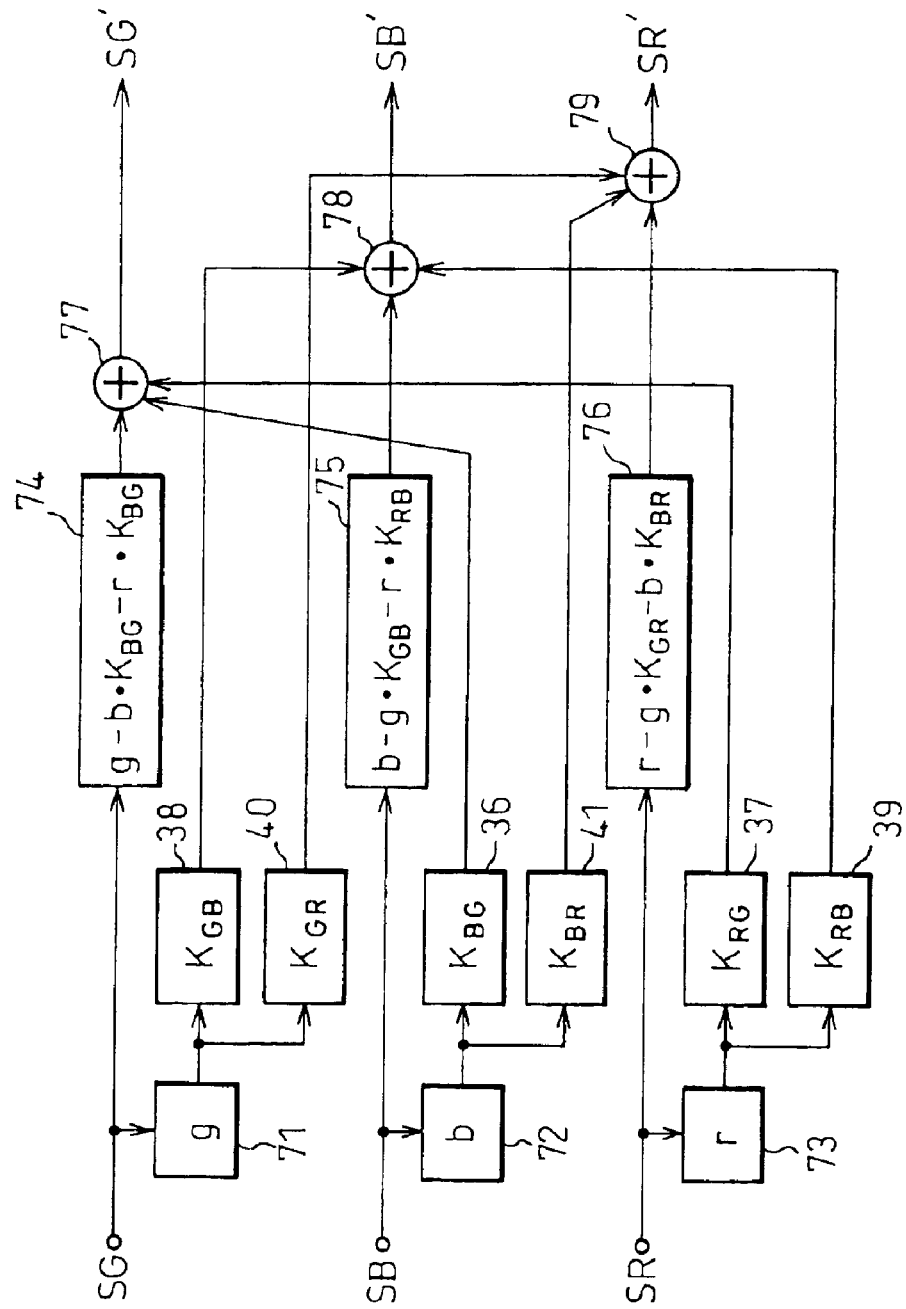
FIG. 11 is a block diagram that shows the structure of the color signal correction circuit in the third embodiment of the present invention.

FIG. 11 is a block diagram that shows the structure of the color signal correction circuit of the plasma display in the third embodiment of the present invention. The color signal correction circuits in the third embodiment are those in the second embodiment, to which multipliers 71, 72, and 73 that multiply each color signal, before multiplied by the mixture coefficients in the multipliers 36 through 41, by g, b, and r (between 0 and 1, and at least one is equal to 1), respectively, and attenuate them are provided, and each multiplier value (g-b $K_{BG}$-r $K_{BG}$), (b-g $K_{GB}$-r $K_{RB}$), and (r-g $K_{GR}$-b $K_{BR}$) is assigned to the multipliers for amplitude correction 74, 75, and 76, respectively.

This enables the white balance adjustment within the color signal correction circuit and the white balance does not change depending on whether or not the color signal correction circuit is used, and the corrected chromaticity values do not change even when the white balance is changed.

Figure 12:
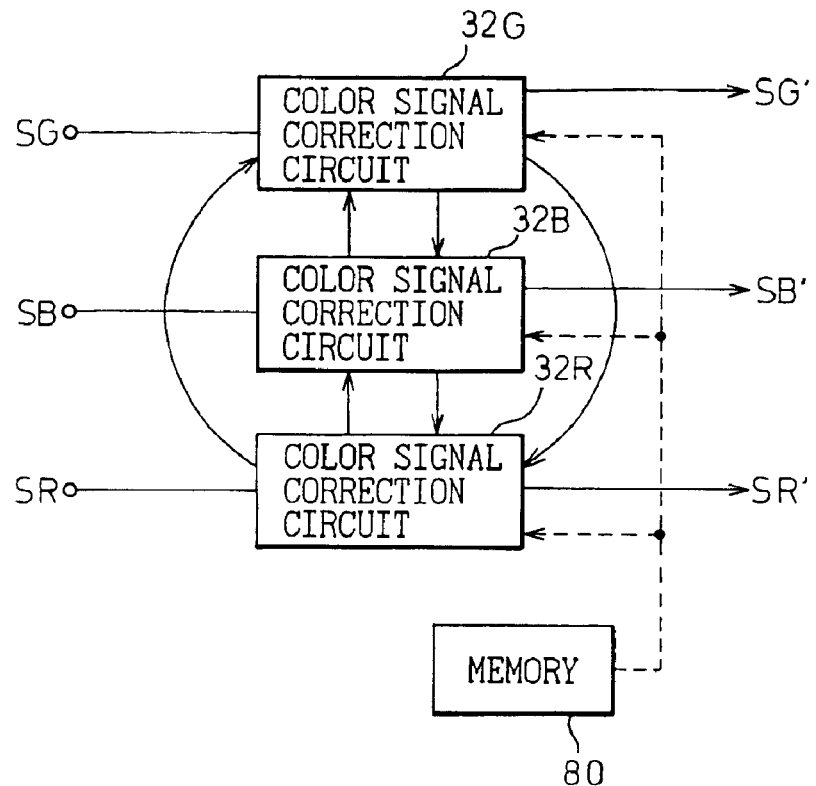
FIG. 12 is a block diagram that shows the structure of the color signal correction circuit in the fourth embodiment of the present invention.

FIG. 12 is a block diagram that shows the structure of the color signal correction circuit of the plasma display in the fourth embodiment of the present invention. Though this circuit has the color signal correction circuits similar to those in the first through the third embodiments, plural different combinations of the mixture coefficients to be multiplied in the multiplier of the color correction circuits are stored in memory 80 in advance in order to deal with plural different systems (signals of which the chromaticity values of the targeted stimulus values (light source) are different), and an appropriate combination can be selected according to the input color video signal system. The multiplier values of the amplitude correction multiplier are obtained by calculation of the stored mixture coefficients or they are calculated and stored in advance according to the mixture coefficients. If the circuit in the present invention is used, the operation values of the color correction circuit can be switched and a color display compliant with various systems can be realized just by adding memory.

The plasma display is a digital display device, of which the luminescent intensity is determined by the number of sustaining pulses and the amplitude of the applied signal is in proportion to the luminescent intensity. Therefore, the circuits in the first through the fourth embodiments are imposed by the condition that the input signal amplitude is in proportion to the luminescent intensity. Normal video signals (NTSC video signals), however, are those to which the γ correction specified in the signal system is applied. Therefore, in the plasma display, the reverse correction of the γ correction (reverse γ correction) specified in the signal system is applied to each input primary color signal, the input signal amplitude is converted to the signal in proportion to the luminescent intensity, and the image processing and image representation are carried out.

Figure 13:
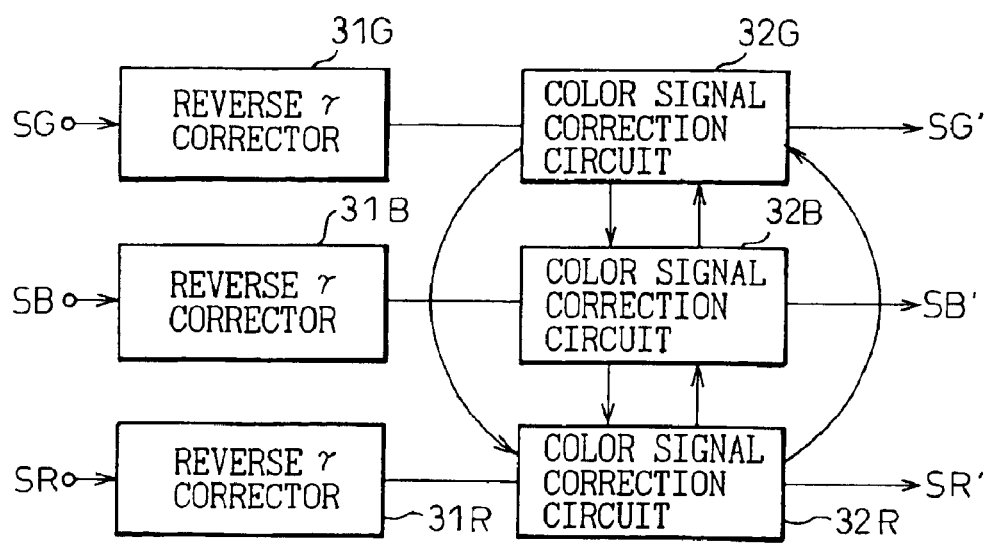
FIG. 13 is a block diagram that shows the structure of the color signal correction circuit in the fifth embodiment of the present invention.

FIG. 13 is a block diagram that shows the structure of the color signal correction circuits in the plasma display in the fifth embodiment of the present invention. In addition to the structure in the first through fourth embodiments, this circuit carries out the operation after the reverse γ correction by the reverse γ correctors 31G, 31B, and 31R. Since the operation process is thus applied to the linear signal, the operation can be carried out only by a linear multiplication and addition. Also, the signal after the operation of correction, the signal can be used for display as is.

While in the fifth embodiment, signals after correction are sent to a (linear) display device such as a plasma display in which the signal amplitude is in proportion to the luminescent intensity, the following sixth embodiment shows the case where a CRT tube, in which the signal amplitude is not in proportion to the luminescent intensity, is used.

Figure 14:
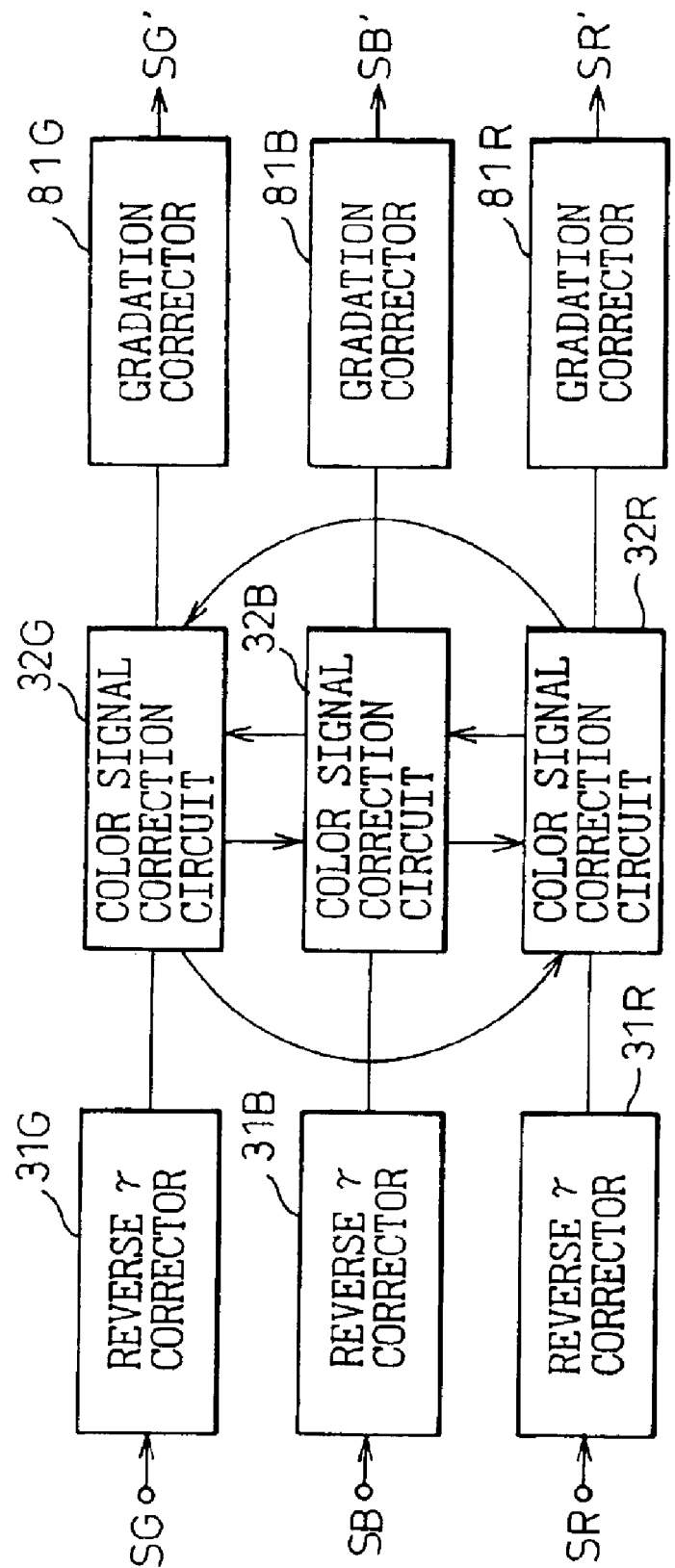
FIG. 14 is a block diagram that shows the structure of the color signal correction circuit in the sixth embodiment of the present invention.

FIG. 14 is a block diagram that shows the structure of the color signal correction circuit in the sixth embodiment of the present invention. The color signal correction circuits in the sixth embodiment have a structure in which gradation correctors 81G, 81B, and 81R are added to the structure in the fifth embodiment. Even when a display device such as a CRT tube, in which the signal amplitude is not in proportion to the luminescent intensity, is used and the γ correction is applied to the input color video signals according to the CRT tube, the reverse γ correction is applied to each primary color signal, the color reproduction distortion of each reverse γ-corrected color signal is corrected, and then the gradation correctors correct so that the signal amplitude of each primary color signal is in proportion to the luminescent intensity according to the display device.

Also, concerning the problem that the corrected signal exceeds the dynamic range, if the range of the mixture coefficient $K_{XY}$ (X, Y represent G, B, and R) is $0 \leq K_{XY} \leq 1$, the ratio between the corrected output and the input before correction does not exceed 1 and the dynamic range is not exceeded, but if $-1 \leq K_{XY} < 0$, the dynamic range may be exceeded. This problem is solved in the seventh embodiment. In other words, the correction over the dynamic range is enabled in the seventh embodiment.

Figure 15:
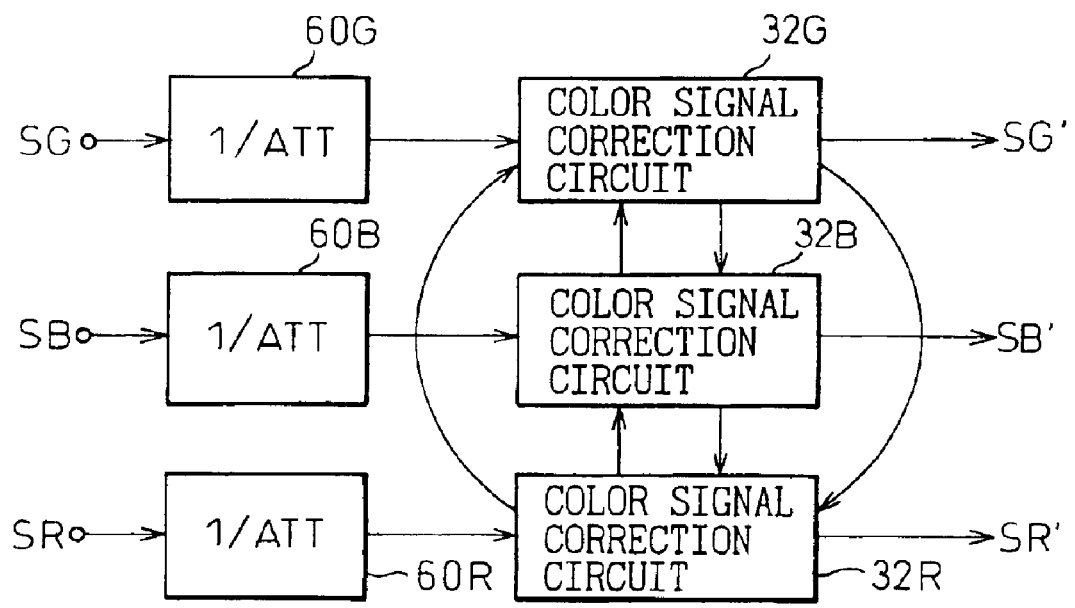
FIG. 15 is a block diagram that shows the structure of the color signal correction circuit in the seventh embodiment of the present invention.

FIG. 15 is a block diagram that shows the structure of the color signal correction circuits of the plasma display in the seventh embodiment of the present invention. The color signal correction circuits in the tenth embodiment have a structure in which attenuation circuits (1/ATT) 60G, 60B, and 60R are provided before each color correction circuit 32G, 32B, and 32R in the second embodiment.

The attenuation circuits (1/ATT) 60G, 60B, and 60R are the circuits that attenuate the input signal to 1/ATT and the characteristics of ATT of the attenuators 60G, 60B, and 60R are shown in the following equation.

$$ATT = \\ \text{MAX}\{1 - (K_{BG} - |K_{BG}|)/2 - (K_{RG} - |K_{RG}|)/2,\ 1 - (K_{GB} - |K_{GB}|)/2 - \\ (K_{RB} - |K_{RB}|)/2,\ 1 - (K_{GR} - |K_{GR}|)/2 - (K_{BR} - |K_{BR}|)/2\}$$

For example, if $K_{XY}$ (X, Y represent G, B, or R) in the equation is $-1 \leq K_{XY} < 0$, the absolute value of $K_{XY}$ is added so that ATT becomes 1 or larger and is then attenuated, and if $0 \leq K_{XY} \leq 1$, zero is added, that is, the value of ATT remains 1 and no amplification or attenuation will be carried out. Thus in the seventh embodiment, the corrected signal does not exceed the dynamic range even when $-1 \leq K_{XY} < 0$.

On the other hand, if the maximum value of the output amplitude of the color signal correction circuit is not reached when the maximum amplitude is applied to each input color video signal, the output amplitude can be corrected by further multiplying the attenuation circuit (1/ATT) by a special coefficient.

As explained above, according to the present invention, the distortion can be reduced only by the modification of the mixture coefficients in any color display device in which a color reproduction distortion exists. Since the correction is carried out in the primary color signal system, the signals in the primary color signal system can be dealt with, which cannot be corrected conventionally. Moreover, since plural demodulation axes are selected in the conventional method, the entire correction in the whole color reproduction area is not impossible, but the present invention enables the perfect correction in the physical color reproduction area in the reproduction color display.

Furthermore, since the color reproduction is improved using the demodulation axis of which the gain is increased in the conventional method, color collapse occurs as an adversely affected result. On the contrary in the present invention, color is demodulated using the original demodulation axis and the gain specified by the input color video signal, and the color reproduction is improved using the primary signal after the color demodulation, therefore, the color collapse is not caused by the color demodulation.

We claim:

1. A color reproduction correction method for color representation that corrects color distortion caused when color input video signals using a first combination of three primary colors are reproduced on a color display that has light sources of a second combination of the primary colors with chromaticity values that differ from those of the first combination, the color reproduction correction method correcting at least a part of each color signal among a plurality of color signals of the color input video signals, the color reproduction correction method comprising:

multiplying the color signal in question by specified coefficients of the first combination to produce a mixed color signal;

adding the mixed color signal to color signals other than the color signal in question;

using mixed colors of the color signal in question and color signals other than the color signal in question in the second combination of the primary color light sources as primary color light sources in the second combination; and determining the specified coefficients of the first combination with the mixed color light sources having coordinates approximately the same as coordinates of the primary color light sources of the first combination in a chromaticity diagram.

2. The color reproduction correction method for color representation of claim 1, further comprising multiplying color signals other than the color signal in question by second specified coefficients, and subtracting an amount corresponding to the mixed color signal to be added respectively from each color signal other than the color signal in question.

3. The color reproduction correction method for color representation of claim 1, further comprising attenuating the color signal in question before multiplication by the specified coefficients of the first combination, the color signal in question being attenuated according to an attenuation ratio.

4. The color reproduction correction method for color representation of claim 2, further comprising attenuating color signals other than the color signal in question using an amplification ratio for color signals other than the color signal in question when the specified coefficients of the first combination are negative and that of the second combination are 1 or more.

5. The color reproduction correction method for color representation of claim 4, further comprising storing and outputting selectively a plurality of combinations of the first specified coefficients and the second specified coefficients, with said attenuating, said multiplying the color signal in question, and said multiplying color signals other than the color signal in question using the first specified coefficients and the second specified coefficients that have been stored.

6. The color reproduction correction method for color representation of claim 1, further comprising performing reverse $\gamma$ correction on the color input video signals.

* * * * *